(12) United States Patent
Tran et al.

(10) Patent No.: US 7,685,602 B1
(45) Date of Patent: Mar. 23, 2010

(54) CONTROLLING SOFTWARE COMPONENTS IN A MULTI-NODE PROCESSING SYSTEM

(75) Inventors: Hoa Thu Tran, Escondido, CA (US); Matthew Dickey, San Diego, CA (US)

(73) Assignee: Teradata US, Inc., Miamisburg, OH (US)

(*) Notice: Subject to any disclaimer, the term of this patent is extended or adjusted under 35 U.S.C. 154(b) by 2809 days.

(21) Appl. No.: 09/587,302

(22) Filed: Jun. 5, 2000

(51) Int. Cl.
G06F 9/44 (2006.01)
G06F 17/30 (2006.01)
G06F 9/46 (2006.01)

(52) U.S. Cl. .................. 719/311; 707/10; 718/106

(58) Field of Classification Search ............. 713/182, 713/1–2; 709/200–253, 1–10; 718/100–108; 707/1–10, 100–104.1; 717/120–121, 168–178; 719/313–317, 328–332, 311
See application file for complete search history.

(56) References Cited

U.S. PATENT DOCUMENTS

| | | | |
|---|---|---|---|
| 5,303,383 A | | 4/1994 | Neches et al. |
| 5,613,148 A | * | 3/1997 | Bezviner et al. ............ 709/203 |
| 5,640,584 A | | 6/1997 | Kandasamy et al. |
| 5,748,896 A | * | 5/1998 | Daly et al. .................. 709/223 |
| 5,802,367 A | * | 9/1998 | Held et al. ................... 719/332 |
| 5,812,779 A | * | 9/1998 | Ciscon et al. ............... 709/223 |
| 5,872,904 A | | 2/1999 | McMillen et al. |
| 5,948,101 A | * | 9/1999 | David et al. .................... 713/2 |
| 6,421,777 B1 | * | 7/2002 | Pierre-Louis et al. .......... 713/2 |
| 6,633,898 B1 | * | 10/2003 | Seguchi et al. ............... 709/201 |
| 6,697,835 B1 | * | 2/2004 | Hanson et al. .............. 709/201 |
| 2002/0112150 A1 | * | 8/2002 | Lawing et al. ................. 713/1 |

OTHER PUBLICATIONS

*An Introduction to NT Services*, pp. 1-14, printed from web site http://www.commsoft.com, dated at least as early as May 18, 2000.
*Service Control Management, Configuration Manager Modules*, pp. 1-3, printed from web site http://www.ntsoftdist.com, dated at least as early as May 18, 2000.
Microsoft Corporation, *Service Control Manager*, pp. 1-6, printed from web site http://msdn.microsoft.com, Jan. 5, 2000.

* cited by examiner

*Primary Examiner*—Hyung S Sough
*Assistant Examiner*—Charles E Anya
(74) *Attorney, Agent, or Firm*—Trop, Pruner & Hu PC

(57) ABSTRACT

A multi-node processing system includes a plurality of nodes in which various software components may be executed. To coordinate the control of the software components in the plural nodes, an instance of a manager module may be started in each of the nodes. In one example arrangement, the manager module may include a WINDOWS® NT or WINDOWS® 2000 service control manager. In the WINDOWS® NT or WINDOWS® 2000 environment, the software components that are controlled through the service control manager may be services. To perform control of the various software components, requests may be sent to the manager module instance in each of the nodes. The manager module then launches one or more server services in each node to perform the desired control task, which may be start the software component, monitor the software component, or terminate the software component.

28 Claims, 9 Drawing Sheets

CONTROLLING SOFTWARE COMPONENTS IN A MULTI-NODE PROCESSING SYSTEM

BACKGROUND

The invention relates to controlling software components in a multi-node processing system.

Software in a computer system may be made up of many layers. The highest layer is usually referred to as the application layer, followed by lower layers that include the operating system, device drivers (which usually are part of the operating system), and other layers. In a system that is coupled to a network, transport and network layers may also be present.

Software components may be installed and loaded as programs in a system. A program is an executable file, and when the program is executed, it is run as a process (e.g., in a UNIX system), a thread (e.g., in a WINDOWS® system), or some other execution unit. During operation of the system, various software components may be started to perform useful tasks.

Software components may be executed on different types of systems, including single processor systems, multiprocessor systems, or multi-node parallel processing systems. Examples of single processor systems include standard desktop or portable systems. A multiprocessor system may include a single node that includes plural processors running in the node. Such systems may include symmetric multiprocessor (SMP) systems. A multi-node parallel processing system may include multiple nodes that may be connected by an interconnect network. Software components may be executed on each of these nodes and run in parallel.

It is not always easy to control (e.g., start up, monitor, or terminate) processes in a multi-node parallel processing system. Because of the distributed nature of a system with multiple nodes, a mechanism may not always be available for control of the software components in the several nodes. Thus, for a parallel software application having software components that can run in a multi-node parallel processing system, a need continues to exist for a convenient and efficient method and apparatus to control software components in the multiple nodes.

SUMMARY

In general, according to one embodiment, a method of controlling software components in a processing system having plural nodes includes receiving a request to start the system and determining one or more selected software components to start in each node. Services are invoked with a manager module to start the selected software components in the nodes of the processing system.

In general, according to another embodiment, a system includes a plurality of nodes and software components in corresponding nodes. A manager module controls the software components in the plural nodes and enables a monitoring module to monitor a status of at least one of the software components.

Other features and embodiments will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible. For example, although reference is made to use of WINDOWS® operating systems in some described embodiments, other embodiments may employ other types of operating systems.

Figure 1:
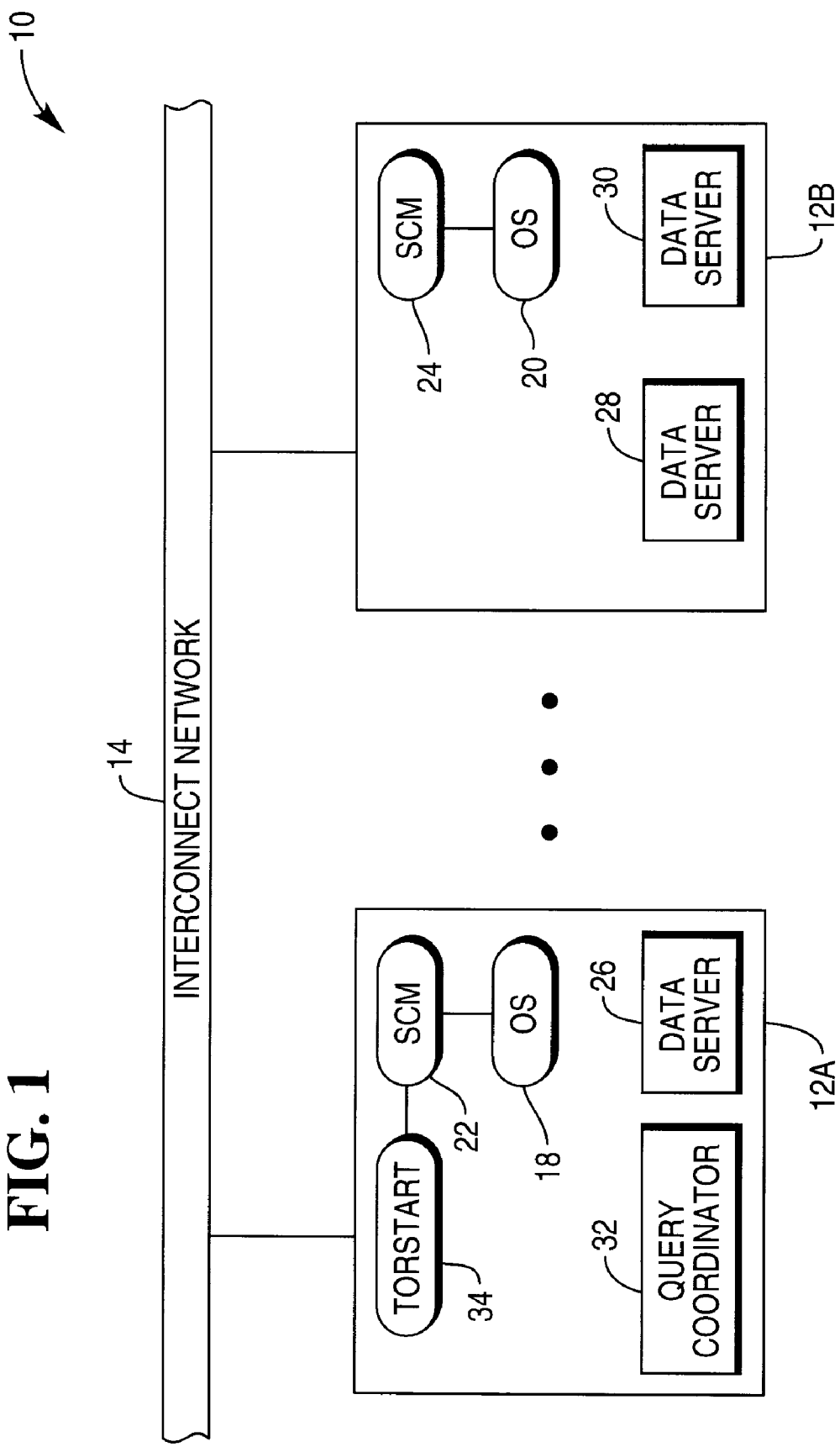
FIG. 1 is a block diagram of an embodiment of a multi-node parallel processing system.

Referring to FIG. 1, a multi-node parallel processing system 10 includes plural nodes (12A, 12B) coupled by an interconnect network 14. Although two nodes are shown in FIG. 1, additional nodes may be coupled by the interconnect network 14. Each of the nodes (12A, 12B) may be referred to as a "node 12." In the example embodiment of FIG. 1, the node 12A is a master node while the node 12B is a slave node. Multiple slave nodes may be coupled to the interconnect network 14.

The interconnect network 14 may be any of various types of networks. For example, the interconnect network 14 may be a local area network (LAN), a wide area network (WAN), or another type of network. Each of the nodes 12 includes a network interface to enable communication over the interconnect network 14.

The nodes 12A and 12B include respective operating systems 18 and 20. In one embodiment, the operating systems (18, 20) are WINDOWS® NT operating systems, WINDOWS® 2000 operating systems, or other WINDOWS® operating systems from Microsoft Corporation. In further embodiments, other types of operating systems may be used. Various software components may be executable in each of the nodes 12 in the system 10. Some of these components may be implemented as services, such as WINDOWS® NT services, which are background processes that are loaded at boot time or during operation of the system. A WINDOWS® NT service is a program that runs in a loop waiting for input, such as user requests from a control program or system events such as messages or process terminations.

In a WINDOWS® NT environment, a service is loaded and controlled by a service controller manager (SCM). FIG. 1 shows an SCM 22 in node 12A and an SCM 24 in node 12B. Services that may be executable in each node 12 include data servers, which are database management modules that control access to storage devices in each node 12.

In the master node 12A, an additional service is a query coordinator 32, which manages the communication of queries to the appropriate one of the data servers 26, 28, and 30 in response to receipt of a database query from a client. In further embodiments, other types of software applications, implemented as services, may be executable in the parallel processing system 10. As used here, a "service" refers to a process or other execution unit that, while running, waits for predetermined inputs or events in the system to perform predefined tasks.

A database managed by the data servers and query coordinator may be an object relational database distributed among the plural nodes 12. In one example, the database is part of a data warehouse system that stores, manages, analyzes, and reports transaction data, e.g., retail transaction data. Generally, a data warehouse may include copies of transaction data that have been structured for query and analysis or reporting. For example, retail transaction data may track purchases made by users of goods and services from participating retail sources. The data warehouse system performs the collection, management, analysis, and reporting of such transaction data. The volume of data involved in a data warehouse system may be extremely large, typically in the gigabyte range and sometimes in the terabyte range.

A start procedure 34 may be invoked in the master node 12A to control startup of desired software components in each of the nodes 12. Through an application programming interface (API), the start procedure 34 cooperates with the SCM 22 and SCM 24 to control the startup of the query coordinator 32, the data servers 26, 28, and 30, and any other software component in the system 10.

In addition, other utilities may be employed to perform other control tasks in connection with the query coordinator 32 and data servers 26, 28, and 30. For example, such other control tasks may include terminating or shutting down various software components, monitoring the status of the software components, and changing configurations of the software components.

Figure 2:
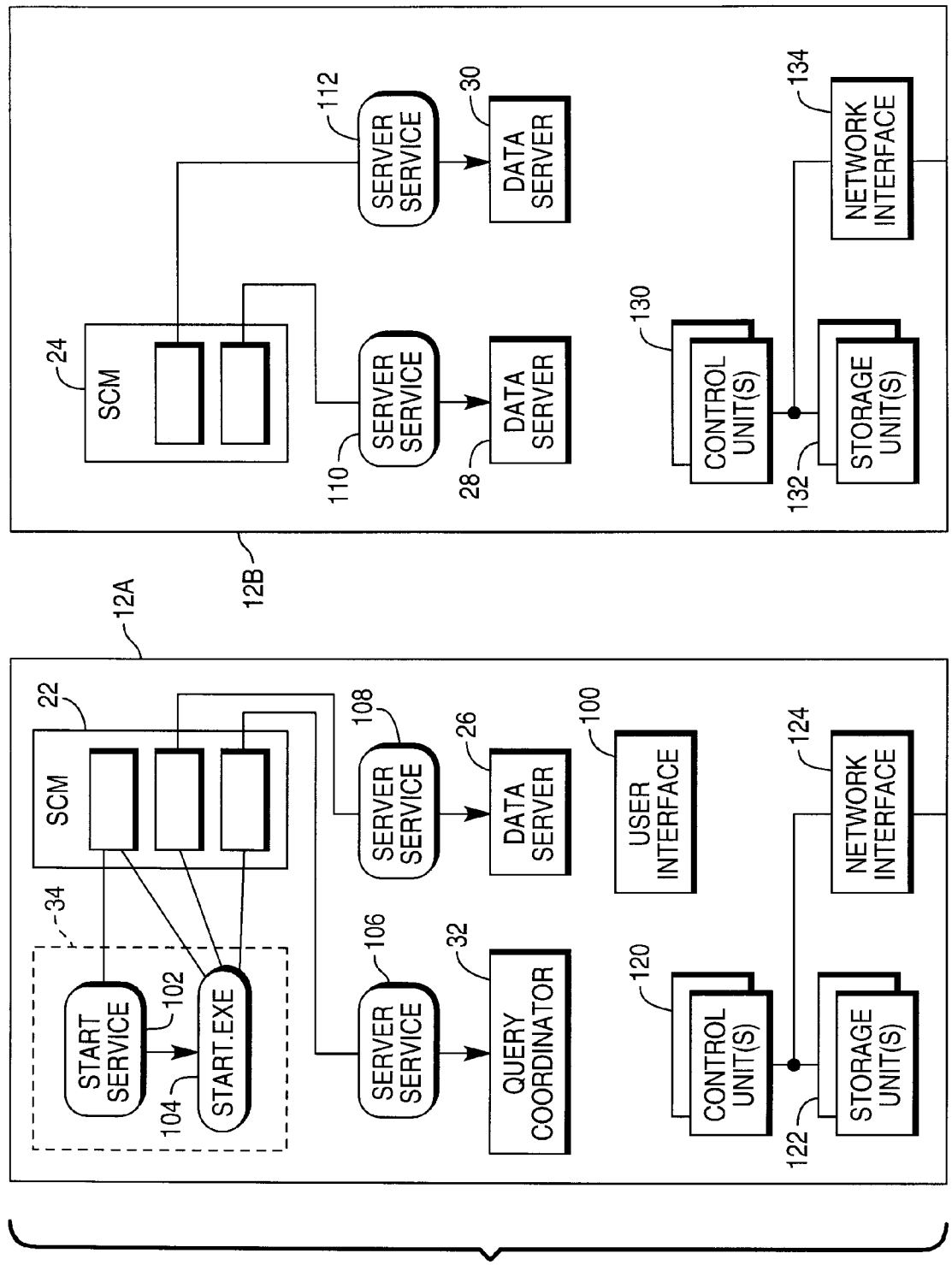
In FIG. 2 illustrates components in nodes of the multi-node parallel processing system of FIG. 1 in accordance with an embodiment.

Referring to FIG. 2, further components of the master node 12A and slave node 12B are illustrated. In the master node 12A, a user interface 100 is provided through which the user can issue requests to perform various control tasks with respect to software components in the system 10. The user interface 100 may include a control panel, a utility, or other user interfaces (whether graphical or text). The start procedure 34 includes a Start service 102 and a Start.exe program 104. The Start service 102 is responsible for handling the WINDOWS® NT services protocol (including communication with the SCM 22) and for initiating the Start.exe program 104. The start service 102 also monitors the status of the process it spawns, in this case the Start.exe process 104. As used here, when a program is executed, it is referred to as a process, which may refer to any execution unit, such as a thread in the WINDOWS® context or a process in the UNIX context.

The Start.exe process 104 acts as a service control program for the query coordinator 32 and the data servers 26, 28, and 30. The Start.exe process 104 starts the query coordinator 32 and data servers 26, 28, and 30 by launching, through the SCMs 22 and 24, their corresponding server services 106, 108, 110, and 112 (in the illustrated system 10). The server service 106 is responsible for starting up the query coordinator 32, while the server services 108, 110, and 112 are responsible for starting up respective data servers 26, 28, and 30. In addition, each of the server services (106, 108, 110, and 112) is responsible for handling the WINDOWS® NT services protocol on behalf of a corresponding child process and for monitoring the child process (one of the query coordinator and data servers).

Once a child process (e.g., the query coordinator 32 or one of the data servers 26, 28, and 30) is started, the server service 106, 108, 110 or 112 monitors the child process and waits for the termination of the corresponding child process. When the child process terminates, the server service 106, 108, 110 and 112 reports the exit code to the SCM (22 or 24) and kills itself.

Instructions associated with the various software applications, modules, routines, or services in the master node 12A may be executable on one or more control units 120. The instructions, and data associated with the instructions, may be stored in one or more storage units 122. A network interface 124 is provided to enable communication between the master node 12A and the interconnect network 14.

Similarly, the instructions of the various software applications, modules, routines, or services in the slave node 12B are executable on one or more control units 130. Instructions and data may be stored in one or more storage units 132 in the node 12B. A network interface 134 enables communication between the interconnect network 14 and the slave node 12B. The network interfaces 124 and 134 in respective nodes 12A and 12B may include network controller cards or chips. The network interfaces 124 and 134 may also include appropriate device drivers and transport and network stacks. As examples, the transport and network stacks may include TCP/IP and/or UDP/IP stacks. IP stands for Internet Protocol, with versions described in Request for Comments (RFC) 791, entitled "Internet Protocol," dated September 1981; and RFC 2460, entitled "Internet Protocol, Version 6 (IPv6) Specification," dated December 1998. TCP is described in RFC 793, entitled "Transmission Control Protocol," dated September 1981; and UDP is described in RFC 768, entitled "User Datagram Protocol," dated August 1980. TCP and UDP are transport layers for managing connections between network elements over an IP network.

Generally, in one aspect of some embodiments of the invention, a coordinated method and apparatus is provided to start software components in plural nodes in a parallel processing system. Instances of manager modules are started in each node, with a start procedure started in a master node. The start procedure issues requests to the manager module instances in each of the nodes to start respective services that are responsible for spawning the desired software components. In a WINDOWS® NT environment, the manager module is a service control manager, with an instance of the service control manager run on each of the nodes in the parallel processing system.

From a single node, desired software components may be started or otherwise controlled in a multi-node system. In addition, by using separate services (such as the starter service 102 and server services 106, 108, 110, and 112) to handle the WINDOWS® NT services protocol, ease of software development is enhanced.

Figure 3:
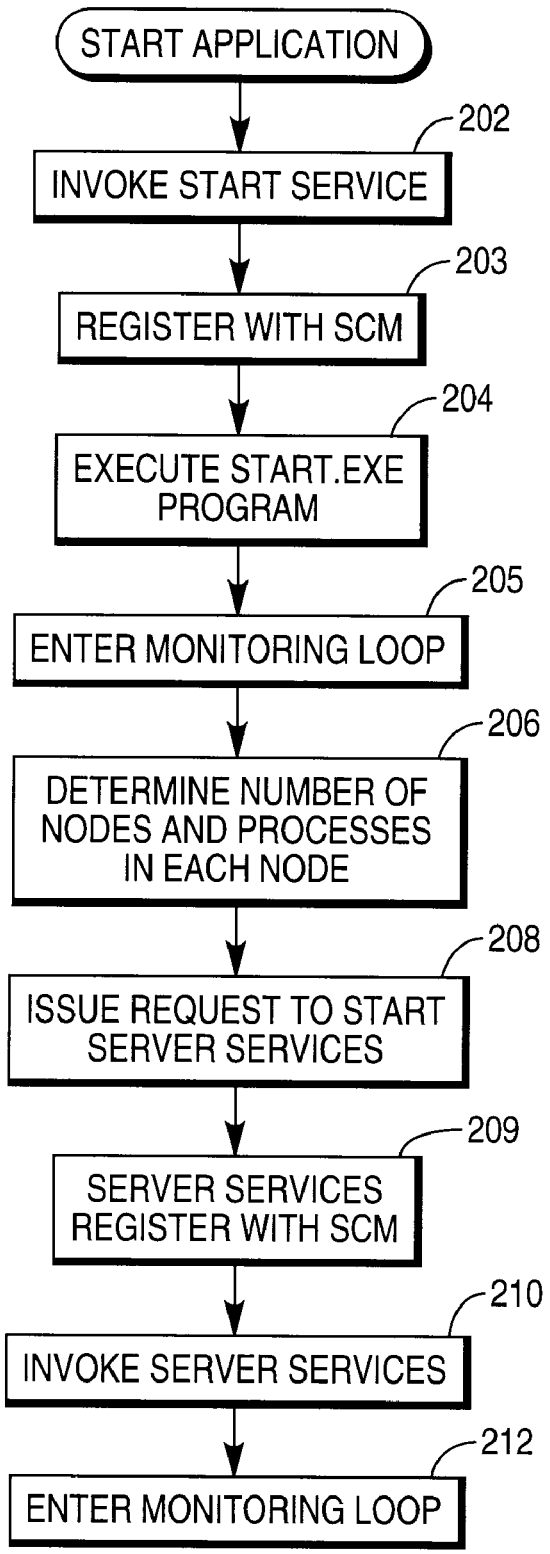
FIG. 3 is a flow diagram of a process to start software components in the multi-node parallel processing system in accordance with an embodiment.

Referring to FIG. 3, a technique for starting the query coordinator 32 and data servers 26, 28, and 30 in the parallel processing system 10 is illustrated. A similar technique may be applied to other software components in the system 10. In response to a command to start the software components, which may be entered by a user or by some other event, the master node 12A launches (at 202) the Start service 102. The Start service 102 then registers (at 203) with the SCM 22. Next, the Start service 102 invokes (at 204) the Start.exe program 104. Once started and executing, the Start.exe program 104 is referred to as the Start.exe process 104. Once it launches the Start.exe process 104, the Start service 102 enters (at 205) its monitoring loop to monitor the Start.exe process 104.

The Start.exe process 104 determines (at 206) the details of the configuration of the system 10. The details may include the number of nodes and processes to be started in each node. The Start.exe process 104 then sends a request to the SCMs 22 and 24 to launch (at 208) the server service for each of the desired child processes in the nodes 12 of the system 10. Parameters are passed with the requests issued by the Start.exe process 104. In response, each server service registers (at 209) with the SCMs 22 and 24. Each server service then spawns (at 210) a corresponding child process (a query coordinator or data server). The server service then enters (at 212)

its monitoring loop, in which it monitors the status of the child processes, which includes the termination of the child process.

Figure 4:
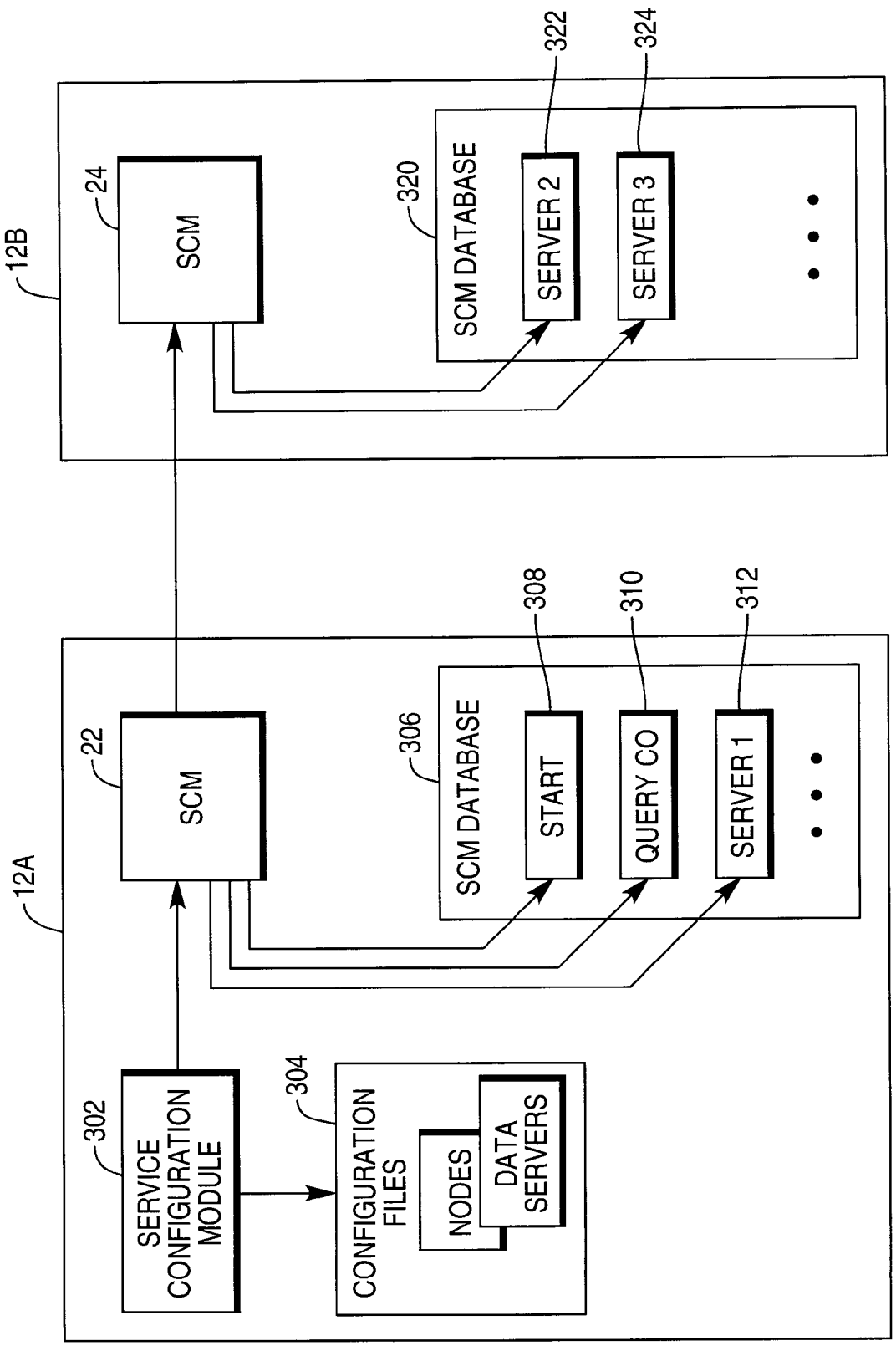
FIGS. 4-9 illustrate interactions between various software modules and routines in the multi-node parallel processing system to start software components in the system.

Referring to FIG. 4, the installation and configuration of services with the SCM (including the SCM 22 and SCM 24) are illustrated. A configuration module 302 accesses configuration information files 304 that may include information pertaining to the nodes of the parallel processing system 10 as well as the software components, such as the Start service 102, the server services, the data servers, and the query coordinator that are executable in the nodes 12. In installing the services, corresponding entries in an SCM database 306 are created. A first entry 308 may contain information pertaining to the Start service 102. A second entry 310 may contain information pertaining to the query coordinator 32 and its associated server service, and a third entry 312 may contain information pertaining to the data server 26 and its associated server service in the master node 12A.

Services may also be installed and configured on remote nodes, including the slave node 12B. The SCM 24 in the slave node 12B includes an SCM database 320 including a first entry 322 containing information relating to the data server 28 (and its associated server service and a second entry 324 containing information relating to the data server 30 (and its associated server service).

Figure 5:
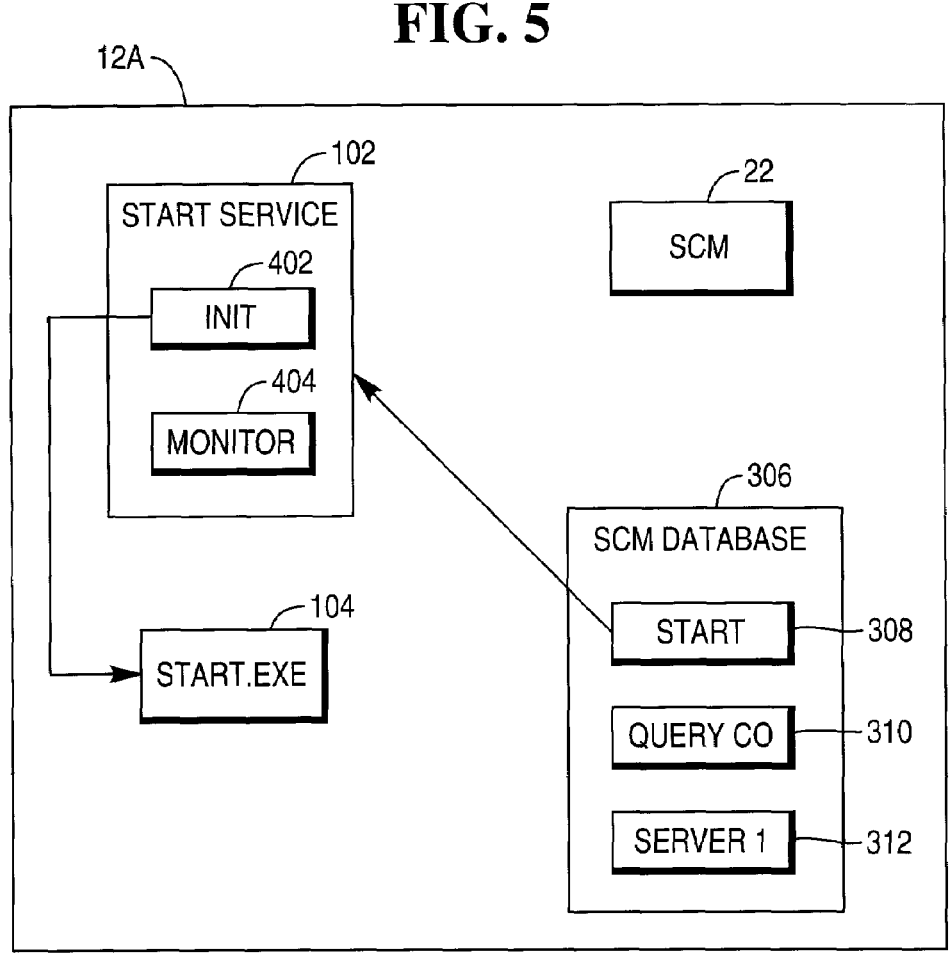

Referring to FIG. 5, in response to a command to start the database application, the entry 308 in the SCM database 306 is used by the SCM 22 to initiate the Start service 102. The Start service 102 includes initiation instructions 402 for starting the Start.exe process 104. The Start service 102 also includes instructions 404 to enter into a monitoring loop after the Start service 102 has spawned the Start.exe process 104.

Figure 6:
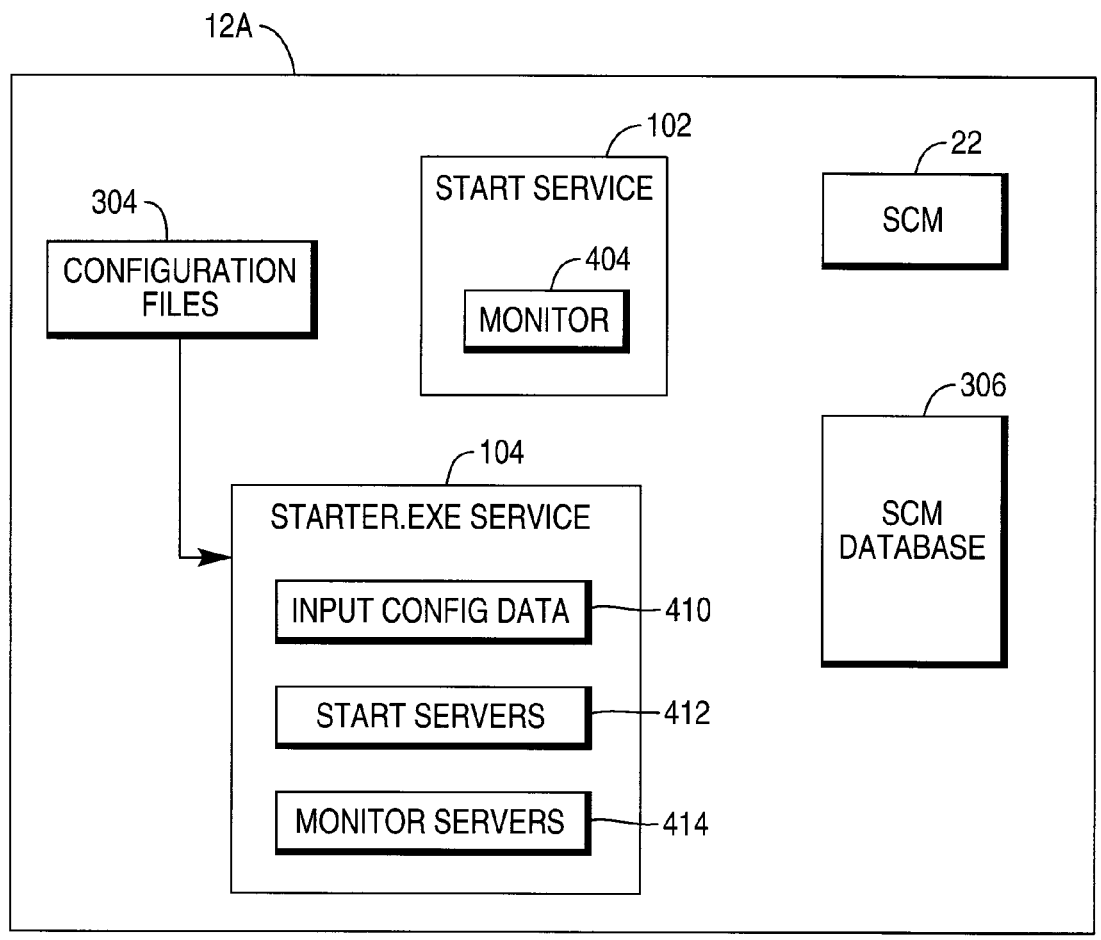

As further shown in FIG. 6, the Starter.exe process 104 includes instructions 410 to retrieve configuration data (relating to the nodes 12, data servers, and query coordinator) from the configuration files 304. The Start.exe process 104 also includes instructions 412 to start a child process (query coordinator or data server) in the nodes 12 of the parallel processing system 10 as well as instructions 414 to monitor the spawned child process. In the monitoring loop, the Start service 102 waits for the Starter.exe process 104 to terminate. The Starter service 102 may also accept status queries and shutdown commands.

Figure 7:
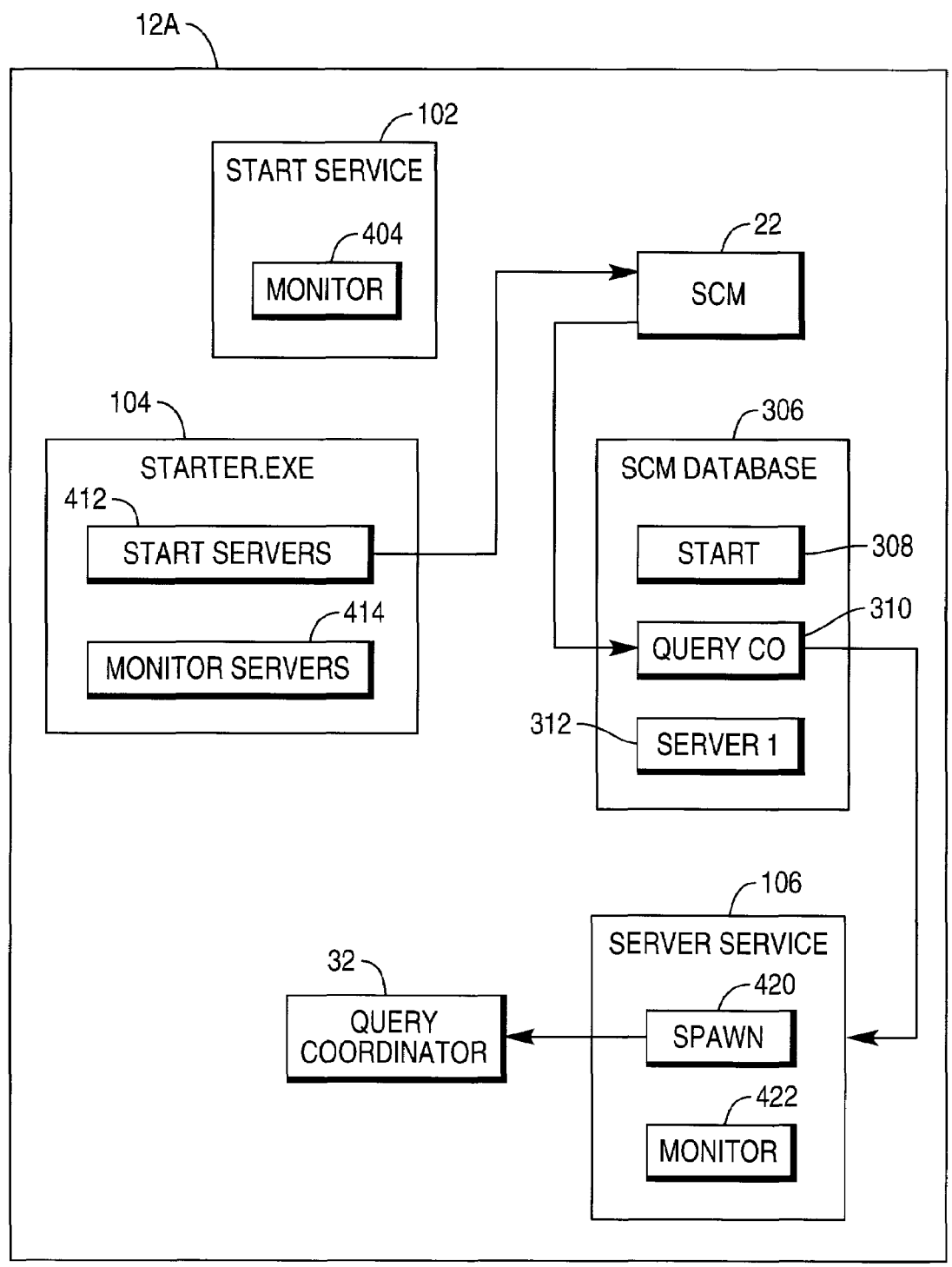

Referring to FIG. 7, under control of the instructions 412, the Start.exe process 104 sends a request to the SCM 22 to start the query coordinator 32. In response, the SCM 22 uses the entry 310 of the SCM database 306 to initiate the first server service 106. The server service 106 contains instructions 420 to spawn the query coordinator 32. The server service 106 also contains instructions 422 for monitoring the spawned query coordinator 32.

Figure 8:
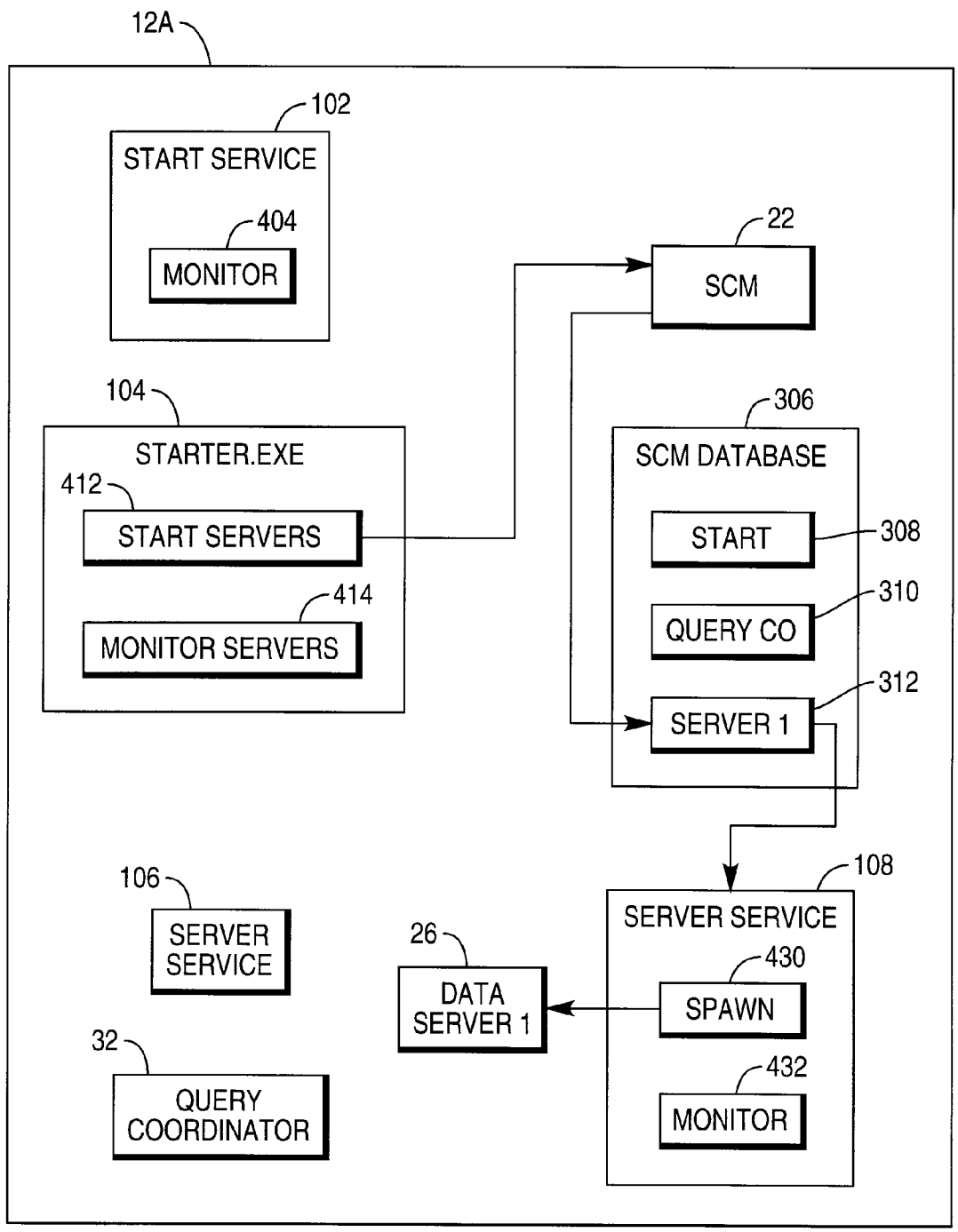

Referring to FIG. 8, the Starter.exe process 104 issues a request to the SCM 22 to start the data server 26. Using information in the entry 312 of the SCM database 306, the SCM 22 invokes the server service 108, which contains instructions 430 to spawn the data server 26. As with the server service 106 for the query coordinator 32, the server service 108 also includes instructions 432 to monitor the status of the data server 26. Spawning of the query coordinator and data servers is accomplished in one embodiment using a WINDOWS® NT CreateProcess( ) call.

Figure 9:
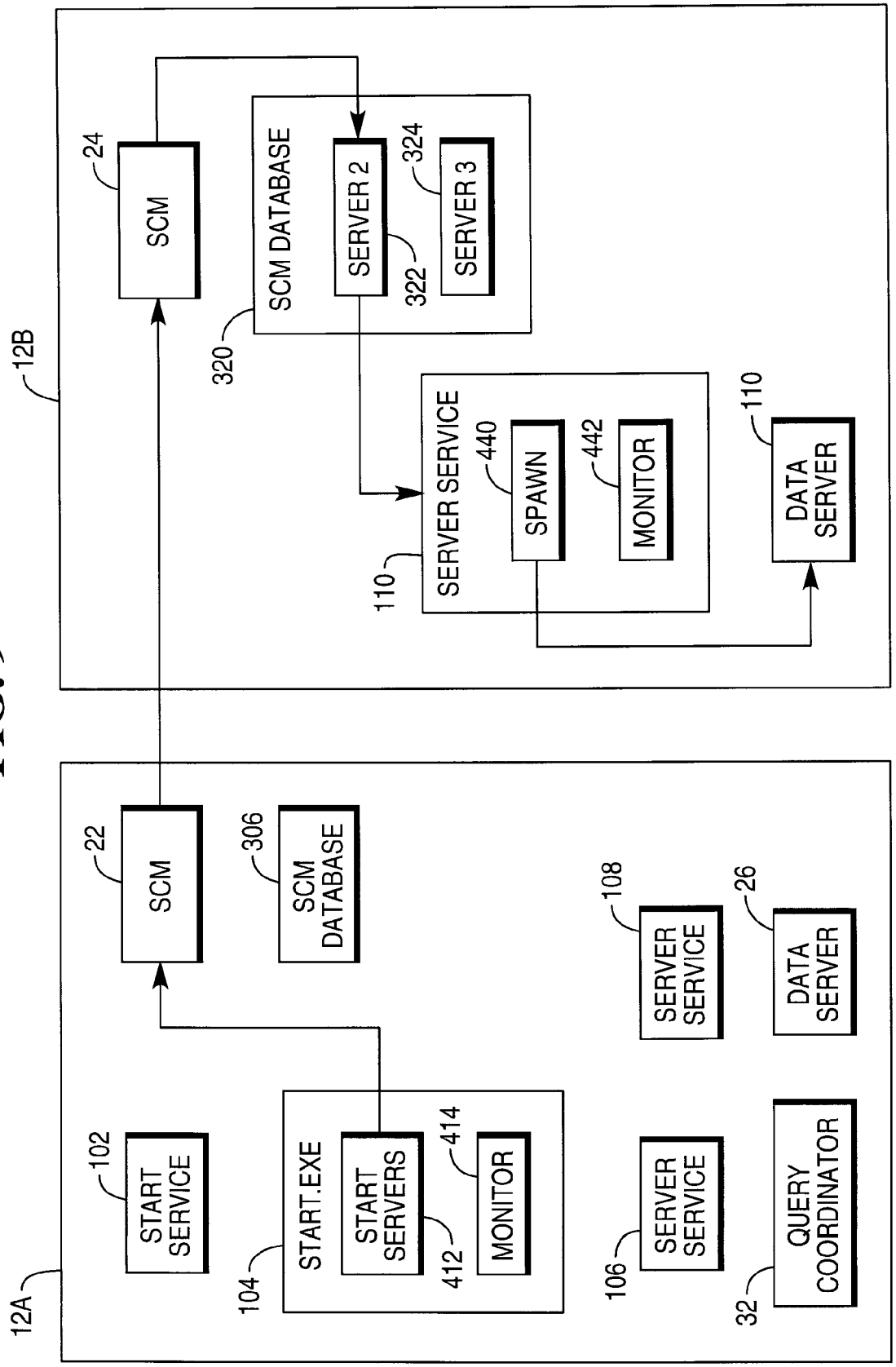

Referring to FIG. 9, the Starter.exe process 104 starts the data server 28 in the remote node 12B. The Starter.exe process 104 issues a request to the SCM 22, which forwards the request to the SCM 24 in the node 12B. Using information in the entry 322 of the SCM database 320, the SCM 24 invokes the server service 110 in the node 12B. Under control of instructions 440, the server service 110 spawns the data server 28. The server service 110 also includes instructions 442 to monitor the status of the data server 28.

Once the query coordinator 32 and all desired data servers 26, 28, and 30 have been started, the Starter.exe process 104 may enter its monitoring loop to check the start of server services 106, 108, 110, and 112 using status queries. Any failed data servers detected by the Starter.exe process 104 may be restarted by restarting the associated server service. If the failed component is the query coordinator 32, then the Starter.exe process 104 causes all server services to exit.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method of controlling software components in a processing system having plural nodes, comprising:
   receiving a request to start the processing system;
   launching a start routine in a first one of the nodes in response to the request; the start routine causing one or more services to be invoked in each of the nodes;
   determining one or more selected software components to start in each of the nodes; and
   the services starting the selected software components in each of the nodes of the processing system.

2. The method of claim 1, wherein causing the services to be invoked comprises causing WINDOWS® services to be invoked.

3. The method of claim 2, further comprising invoking the services with a WINDOWS® service control manager module.

4. The method of claim 1, wherein starting the selected software components comprises starting software components defined as WINDOWS® services.

5. The method of claim 1, further comprising running an instance of a manager module in each of the nodes, the instance of the manager module in each of the nodes responsive to the start routine to invoke the services.

6. The method of claim 5, further comprising the start routine communicating requests to manager module instances in each of the nodes to start corresponding services.

7. The method of claim 1, wherein the first one of the nodes is a master node, wherein launching the start routine is performed in the master node.

8. The method of claim 1, wherein causing the services to be invoked comprises causing one service to be invoked for each software component.

9. The method of claim 1, wherein the processing system comprises a parallel database system, and wherein the selected software components comprises database software components.

10. The method of claim 9, wherein starting the database software components comprises starting a query coordinator in each of the nodes to process database queries.

11. The method of claim 9, wherein starting the database software components comprises starting a data server in each of the nodes to control access of data in storage in the parallel database system.

12. The method of claim 1, wherein each a the services monitors a status of a corresponding one of the selected software components.

13. The method of claim 1, wherein each of the services monitors for termination of a corresponding one of the selected software components.

14. A database system comprising:

a plurality of nodes;

software components executable in the plurality of nodes, the software components comprising a query coordinator in each of the plurality of nodes to process database queries;

a manager module executable in the database system to invoke services in the plurality of nodes to control starting of the software components; and a start procedure executable in a first one of the plurality of nodes to invoke the services in the plurality of nodes through the manager module.

15. The database system of claim 14, wherein the manager module comprises plural instances executable on the plurality of nodes.

16. The database system of claim 14, wherein the manager module comprises a WINDOWS® service control manager.

17. The database system of claim 14, wherein the services comprise WINDOWS® services.

18. The database system of claim 14, wherein the start procedure comprises a start service and a program invokable by the start service.

19. The database system of claim 14, further comprising a storage, wherein the software components further comprise a data server in each of the plurality of nodes to control access to data in the storage.

20. The database system of claim 14, wherein each of the services is adapted to monitor for termination of a corresponding query coordinator.

21. The database system of claim 14, wherein the start procedure is adapted to be invoked in response to a request to start a database application.

22. A database system comprising:

a plurality of nodes;

database software components executable in the plurality of nodes; and a manager module in each of the plurality of nodes executable to control the database software components in the plurality of nodes and to enable a monitoring module to monitor statuses of the database software components in the plurality of nodes.

23. An article comprising one or more machine-readable storage media containing instructions that when executed cause a database system having plural nodes to:

receive a command to start database software components in the plural nodes; launch a start routine in a first one of the plural nodes in response to the command;

issue requests, from the start routine, to the plural nodes; and in response to the requests, invoke services in the plural nodes to start the database software components.

24. The article of claim 23, wherein the command to start the database software components comprises a command to start a query coordinator to process database queries and a data server to control access of data in storage in each of the plural nodes.

25. The article of claim 23, wherein the instructions when executed cause the database system to cause each of the services to monitor for termination of a corresponding one of the database software components.

26. A database system comprising:

a plurality of nodes;

database software components executable in the plurality of nodes; and a start procedure executable in a first one of the plurality of nodes to invoke services in each of the plurality of nodes, and wherein the services are executable to start the database software components.

27. The database system of claim 26, further comprising a storage, wherein the database software components comprise a query coordinator in each of the plurality of nodes to process database queries, and a data server in each of the plurality of nodes to control access of the storage.

28. The database system of claim 26 wherein one service is invoked in each of the plurality of nodes for each of the database software components in the node.

* * * * *